United States Patent
Ishikawa et al.

(10) Patent No.: US 6,638,385 B2
(45) Date of Patent: Oct. 28, 2003

(54) PROCESS FOR PRODUCING AN ELECTRODE ASSEMBLY FOR AN ELECTRONIC DOUBLE LAYER CAPACITOR

(75) Inventors: Takamichi Ishikawa, Kanagawa (JP); Sadao Kanetoku, Kanagawa (JP); Masaaki Ikemura, Kanagawa (JP); Yasuo Shinozaki, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/961,289

(22) Filed: Sep. 25, 2001

(65) Prior Publication Data

US 2002/0059975 A1 May 23, 2002

(30) Foreign Application Priority Data

Sep. 26, 2000 (JP) ........................................ 2000-292680

(51) Int. Cl.⁷ ...................... B32B 31/12; B32B 31/20; H01G 9/00
(52) U.S. Cl. ................ 156/182; 156/229; 156/244.11; 156/244.23; 156/244.24; 29/25.03; 361/502
(58) Field of Search ...................... 156/244.11, 244.23, 156/244.24, 306.6, 244.26, 182, 229, 1; 361/502; 29/25.03

(56) References Cited

U.S. PATENT DOCUMENTS

| | | | |
|---|---|---|---|
| 4,713,731 A | * 12/1987 | Boos et al. | |
| 4,862,328 A | 8/1989 | Morimoto et al. | |
| 5,277,729 A | * 1/1994 | Endo et al. | |
| 5,581,438 A | * 12/1996 | Halliop | 361/502 |
| 5,706,165 A | * 1/1998 | Saito et al. | 361/502 |
| 5,953,204 A | * 9/1999 | Suhara et al. | 361/502 |
| 6,072,692 A | * 6/2000 | Hiratsuka et al. | 361/502 |
| 6,134,760 A | * 10/2000 | Mushiake et al. | 29/25.03 |
| 6,195,251 B1 | * 2/2001 | Suhara et al. | 361/502 |
| 6,236,560 B1 | * 5/2001 | Ikeda et al. | 361/502 |
| 6,246,568 B1 | * 6/2001 | Nakao et al. | 361/502 |
| 6,264,707 B1 | * 7/2001 | Ishikawa et al. | 29/25.03 |
| 6,282,081 B1 | * 8/2001 | Takabayashi et al. | 361/502 |
| 6,335,857 B1 | 1/2002 | Takimoto et al. | |
| 6,349,027 B1 | * 2/2002 | Suhara et al. | 361/502 |
| 6,383,427 B2 | * 5/2002 | Ishikawa et al. | 264/105 |
| 6,411,496 B1 | * 6/2002 | Suhara et al. | 361/502 |
| 2001/0042881 A1 | * 11/2001 | Ishikawa et al. | 361/305 X |
| 2002/0054472 A1 | * 5/2002 | Ishikawa et al. | 361/502 |

FOREIGN PATENT DOCUMENTS

| | | | |
|---|---|---|---|
| EP | 0 977 219 | | 2/2000 |
| JP | 8-45793 | * | 2/1996 |
| JP | 10-223487 | * | 8/1998 |
| JP | 10-270296 | * | 10/1998 |
| JP | 11-297579 | * | 10/1999 |
| JP | 2000-235938 | * | 8/2000 |

OTHER PUBLICATIONS

Patent Abstracts of Japan, JP 03–283518, Dec. 13, 1991.
Patent Abstracts of Japan, JP 04–068512, Mar. 4, 1992.

* cited by examiner

Primary Examiner—Curtis Mayes
(74) Attorney, Agent, or Firm—Oblon, Spivak, McClelland, Maier & Neustadt, P.C.

(57) ABSTRACT

A process for producing an electrode assembly for an electric double layer capacitor having an electrode layer comprising a carbonaceous material and a first binder, formed on at least one side of a metal current collector foil, which comprises the following steps A to D:

Step A: a step of coating an electroconductive adhesive comprising an electroconductive powder, a second binder and a solvent, on at least one side of a metal current collector foil;

Step B: a step of drying the metal current collector foil coated with the electroconductive adhesive to remove at least a part of the solvent and to form an electroconductive bonding layer;

Step C: a step of preparing a formed product of sheet shape comprising the carbonaceous material and the first binder; and Step D: a step of placing the formed product of sheet shape on the electroconductive bonding layer to form a laminate comprising the metal current collector foil and the formed product of sheet shape, and rolling the laminate to reduce the thickness of the formed product of sheet shape by from 5 to 60% and to form an electrode layer comprising the formed product of sheet shape.

26 Claims, No Drawings

PROCESS FOR PRODUCING AN ELECTRODE ASSEMBLY FOR AN ELECTRONIC DOUBLE LAYER CAPACITOR

The present invention relates to a process for producing an electrode assembly for an electric double layer capacitor.

The demand for an electric double layer capacitor utilizing an electric double layer formed at the interface between a polarizable electrode and an electrolyte, particularly for a coin shaped one, is rapidly increasing recently, as a memory backup power source. On the other hand, it is desired to develop an electric double layer capacitor having a large capacitance per unit volume (hereinafter referred to as capacitance density), small internal resistance, a high energy density and a high output density, also for a use which requires a large capacity such as a power source for electric cars. Further, with regard to an electric double layer capacitor for memory backup, it is desired to reduce the internal resistance.

In order to reduce the internal resistance, it is necessary to use a material having a low resistance as the material for constituting the electrode and to efficiently collect the electric current. For this purpose, it is common to use an electrode of sheet shape comprising an electroconductive material, as bonded to the surface of a current collector foil having a low resistance. However, if the thickness of the electrode of sheet shape is thick, the resistance can not be made adequately low, and it is necessary to obtain a thin electrode of sheet shape. Further, the capacitance density is higher, as the amount of the electrode material (such as a carbonaceous material having a high specific surface area) as the main material for forming an electric double layer, present per unit volume of the electrode, is larger. Accordingly, it is necessary to increase the density of the electrode of sheet shape.

The electrode for an electric double layer capacitor is prepared, for example, by kneading an activated carbon powder with a solvent for an electrolytic solution such as sulfuric acid, and forming the mixture into a slurry, followed by press forming (U.S. Pat. No. 3,288,641). However, the electrode obtained by this process has a stiff porous structure and thus is likely to be cracked or broken, and it can not be used for a long period of time. On the other hand, a carbon-paste electrode has been proposed which is made of a viscous material having a binder made of a polytetrafluoroethylene (hereinafter referred to as PTFE) added to a mixture comprising an activated carbon powder and an electrolytic solution, as the case requires (JP-B-53-7025, JP-B-55-41015). This electrode is flexible and has crack resistance and break resistance. However, it is inadequate in the shape keeping property, and a cell having a special structure is required to supplement the strength for its use.

In order to obtain an electrode having crack resistance and break resistance, and an excellent shape keeping property, a process has been proposed, which comprises preliminarily molding a kneaded material comprising a carbonaceous material, a binder such as PTFE and a liquid lubricant, followed by stretching or rolling to obtain a formed electrode of sheet shape (JP-A-63-107011, JP-A-2-235320). However, by this process, PTFE is randomly fibrillated by kneading, and a fibrillated portion and a non-fibrillated portion will be formed, and consequently the hardness of the two portions will be different. Therefore, when the sheet electrode is formed into a thin film sheet having, for example, a thickness of at most 0.2 mm, the surface tends to be irregular, and holes are likely to be formed. Therefore, the capacitance density of the electric double layer capacitor can not be made large, and further the internal resistance is large.

As a method for solving the above problems, a method has been proposed wherein a mixture comprising a carbonaceous material, PTFE and a liquid lubricant, is subjected to paste extrusion or screw extrusion, followed by rolling, to obtain an electrode formed into a sheet shape (JP-A-2000-235938, JP-A-11-283887). By such a method, a thin sheet having high strength can be obtained, but the density of the electrode of sheet shape can not be made high, since the electrode of sheet shape is smoothly made thin by rolling. Accordingly, there is a problem that the capacitance density can not be adequately increased.

On the other hand, a method has also been proposed wherein an activated carbon powder and PTFE are mixed and formed into a paste, which is coated on a current collector, dried and then heated to a temperature of at least the melting point of PTFE, followed by press forming to make the electrode thin and also to increase the density (JP-A-9-36005). However, this method has a problem such that the production steps are so complicated that it is difficult to make them continuous, and a part of PTFE melts so that the internal resistance will be high.

The present invention has been made to overcome the above-mentioned problems of the prior art, and it is an object of the present invention to provide a process for producing an electrode having an electrode layer with a high density and a low resistance, formed on a current collector, thereby to provide an electric double layer capacitor having a high capacitance density and low internal resistance, particularly an electric double layer capacitor for an application where a large capacitance and a high power are required.

The present invention provides a process for producing an electrode assembly for an electric double layer capacitor having an electrode layer comprising a carbonaceous material and a first binder, formed on at least one side of a metal current collector foil, which comprises the following steps A to D:

Step A: a step of coating an electroconductive adhesive comprising an electroconductive powder, a second binder and a solvent, on at least one side of a metal current collector foil;

Step B: a step of drying the metal current collector foil coated with the electroconductive adhesive to remove at least a part of the solvent and to form an electroconductive bonding layer;

Step C: a step of preparing a formed product of sheet shape comprising the carbonaceous material and the first binder; and Step D: a step of placing the formed product of sheet shape on the electroconductive bonding layer to form a laminate comprising the metal current collector foil and the formed product of sheet shape, and rolling the laminate to reduce the thickness of the formed product of sheet shape by from 5 to 60% and to form an electrode layer comprising the formed product of sheet shape.

Now, the present invention will be described in detail with reference to the preferred embodiments.

In this specification, an electrode assembly refers to an assembly having an electrode layer formed on one side or both sides of a metal current collector foil, so that the metal current collector foil and the electrode layer are integrated. When such an electrode assembly is used on a positive electrode side, it will be referred to as a positive electrode assembly, and when it is used on a negative electrode side, it will be referred to as a negative electrode assembly.

The electric double layer capacitor is based on a principle such that an electric double layer is formed at the interface between an electrode material and an electrolyte, thereby to store an electric charge at the electric double layer. In the present invention, a carbonaceous material is used as the electrode material. As the carbonaceous material, a powder of e.g. activated carbon, polyacene or carbon black, is preferred, and carbon fiber, carbon whisker or a fiber or powder of e.g. graphite can also preferably be used. As the activated carbon, a phenol type, a rayon type, an acrylic type, a pitch type or a coconut shell type, may be used.

The above carbonaceous material preferably has a pore volume of from 0.7 to 1.2 $cm^3/g$ and a specific surface area of from 900 to 2,300 $m^2/g$. The specific surface area is particularly preferably from 1,500 to 2,300 $m^2/g$. Further, it is more preferred that the pore volume is from 0.75 to 1.1 $cm^3/g$, and the specific surface area is from 1,700 to 2,100 $m^2/g$. If the pore volume or the specific surface area is small, the mass capacity per unit volume of the carbonaceous material itself will be small, whereby the capacitance density of the electric double layer capacitor can not be increased. On the other hand, if the pore volume or the specific surface area is too large, it tends to be difficult to increase the density of the electrode of sheet shape, whereby it tends to be difficult to increase the capacitance density of the electric double layer capacitor.

In the present invention, in addition to the carbonaceous material having the above physical properties, a carbonaceous material having a high electroconductivity such as carbon black, may be used as an electroconductive material, as mixed with another carbonaceous material. The specific surface area of the electroconductive material is preferably from 200 to 1,500 $m^2/g$, particularly preferably from 500 to 1,200 $m^2/g$. The electroconductive material is preferably contained in an amount of from 2 to 20% in the electrode. If the electroconductive material is too much, the carbonaceous material having a high specific surface area will correspondingly be small, whereby the capacitance tends to be small. If the electroconductive material is too small, there will be no substantial effect to reduce the internal resistance of the electrode. The electrode comprising the above-mentioned carbonaceous material having a high specific surface area, the above-mentioned electroconductive material and the first binder, wherein the electroconductive material is contained at the above-described content, has a low internal resistance, and its capacitance can be maintained at a high level, such being advantageous.

As the electroconductive adhesive to be used in step A, an adhesive comprising an electroconductive powder, a second binder and a solvent, is used. As the electroconductive powder, an electroconductive powder of carbon type, such as carbon black or graphite, is preferred. As the second binder, a resin having a high heat resistance and being excellent in the chemical resistance, mechanical properties, dimensional stability, etc., or its precursor, is preferred. Especially when a non-aqueous type electrolyte is used as the electrolyte for the electric double layer capacitor, a voltage higher than the voltage for decomposition of water, is applied for the operation, and accordingly it is required to sufficiently remove water in the cell in its production, and for this purpose, heat treatment, etc. of the electrode assembly will be required.

Accordingly, when a non-aqueous type electrolyte is used, the above resin preferably has a heat resistance temperature of at least 200° C. Here, the precursor of the resin is one which is converted to such a resin by a reaction under e.g. heating. Specifically, the above resin may preferably be polyimide, polyamideimide, polyvinylidene fluoride, cellulose, polyvinyl alcohol or the like, or a precursor thereof. Especially when a non-aqueous type electrolyte is used, polyimide, polyamideimide or polyvinyliden fluoride is, for example, preferred.

The solid content concentration (the total amount of the electroconductive powder and the binder) in the electroconductive adhesive is preferably from 10 to 40%, particularly preferably from 20 to 35%, of the total mass of the electroconductive adhesive. If the concentration is too low, the amount of the solvent to be removed tends to be large, whereby the efficiency of the process tends to be poor. On the other hand, if the concentration is too high, the viscosity tends to be high, whereby coating tends to be difficult, or the electroconductive bonding layer tends to be unnecessary thick. Further, the proportion of the electroconductive powder in the electroconductive adhesive thereby obtained, is preferably from 30 to 90% from the viewpoint of both the electroconductivity and the bond strength of the bonding layer.

The method of coating the electroconductive adhesive on the metal current collector foil is not particularly limited, and various methods such as dropping, brush coating, spraying and doctor blade coating, may be employed. In order to let the metal current collector foil play also a role as a lead portion, the electroconductive adhesive is not applied to a portion of the metal current collector foil which will be a lead portion, and the adhesive is applied to the portion to be bonded with the formed product of sheet shape.

In the present invention, after coating the electroconductive adhesive on the metal current collector, drying is carried out in step B to remove at least a part of the solvent in the electroconductive adhesive, preferably remove the solvent until it becomes not more than 20%, more preferably not more than 10%, still more preferably not more than 5%, of the total mass of the electroconductive bonding layer. If a formed product of sheet shape prepared in separate step C, is placed in a state where a large amount of the solvent is present in the electroconductive bonding layer, and the obtained laminate is rolled, the solvent in the electroconductive bonding layer is likely to penetrate into void spaces of the formed product of sheet shape or into pores of the carbonaceous material.

If the solvent in the electroconductive bonding layer will remain in the formed product of sheet shape, a certain reaction takes place between the solvent and the carbonaceous material or the electrolyte when a voltage is applied, whereby the output of the electric double layer capacitor may decrease, or the performance may deteriorate if used for a long period of time, although the situation may vary depending upon the combination of the type of the solvent and the electrolyte of the electric double layer capacitor. Therefore, it is necessary to remove the solvent sufficiently by e.g. heating so that it will not remain in the formed product of sheet shape, but the solvent penetrated into pores of the carbonaceous material may not be sufficiently removed by heating or the like.

Whereas, in the present invention, at least a part of the solvent in the electroconductive bonding layer is removed before the formed product of sheet shape is placed thereon, whereby penetration of the solvent into the formed product of sheet shape can be prevented, and deterioration of the performance of the electric double layer capacitor can be prevented. Such effects will be particularly high when the solvent is removed until the solvent becomes not more than 20% of the total mass of the electroconductive bonding layer.

After removing at least a part of the solvent in the electroconductive bonding layer, the formed product of sheet shape is placed on the electroconductive bonding layer in step D, to prepare a laminate comprising the metal current collector foil and the formed product of sheet shape. In a case where a formed product of sheet shape is bonded to each side of the metal current collector foil, an electroconductive adhesive layer may be formed on each side of the metal current collector foil in step B, and the metal current collector foil may be sandwiched between two sheets of the formed product of sheet shape. The formed product of sheet shape is one separately prepared in step C. Either step A or step C may precede the other, and likewise, either step B or step C may precede the other. Step C will be described hereinafter.

The laminate thus obtained, will then be rolled through reduction rolls. Here, rolling is carried out so that the thickness of the formed product of sheet shape decreases by from 5 to 60% from the thickness before rolling (hereinafter, this numerical value will be referred to as a rolling reduction ratio). If only the formed product of sheet shape is rolled without fixing, the thickness of the formed product of sheet shape becomes thin, but the area expands, whereby the density of the formed product of sheet shape will not be substantially increased. Whereas, in the present invention, the formed product of sheet shape is laminated to the metal current collector foil via the electroconductive bonding layer, and the formed product of sheet shape is rolled as fixed on the metal current collector foil, whereby the expansion of the area of the formed product of sheet shape depends on the range of elongation of the metal current collector foil. Therefore, the thickness of the formed product of sheet shape becomes thin by the rolling, but the area will not expand so much, whereby the density of the formed body of the sheet shape will be increased.

Here, if the rolling is carried out at a rolling reduction ratio of smaller than 5%, the density of the formed product of sheet shape can not be adequately increased, or no adequate adhesion is obtainable between the metal current collector foil and the formed product of sheet shape. On the other hand, if the rolling is carried out at a rolling reduction ratio exceeding 60%, the metal current collector foil tends to hardly follow the stretching, whereby the metal current collector foil is likely to break, or cracks are likely to form. The rolling reduction ratio is particularly preferably from 5 to 50%, more preferably from 20 to 50%.

Further, the percent elongation of the formed product of sheet shape and the metal current collector foil at the time of the above rolling, is preferably from 1 to 40%, particularly preferably from 5 to 25%. If this percent elongation is too high, the density of the formed product of sheet shape can not be made sufficiently high. If the percent elongation is too low, cracks are likely to form in the formed product of sheet shape.

In the present invention, the rolling in the operation of step D is preferably carried out so that the density of the formed product of sheet shape will increase by from 2 to 50%, particularly preferably by from 5 to 30%. The operation of step D is intended to increase the density of the formed product of sheet shape, and if the increase of the density is less than 2% as compared with prior to the rolling, the merit in carrying out step D is little, and the capacitance density of the electric double layer capacitor can not adequately be increased, although the situation may depend also on the density before the rolling of the formed product of sheet shape to be used. On the other hand, if it is attempted to increase the density by more than 50%, an excessive load will be exerted to the formed product of sheet shape, whereby cracks are likely to form.

The metal current collector foil is preferably made of aluminum or an aluminum alloy, since it is light in weight and highly electroconductive. Further, the metal current collector foil is preferably preliminarily surface-treated by a chemical method and/or a mechanical method, and the electroconductive adhesive is coated on the surface-treated side, for bonding with the formed product of sheet shape. The chemical method may, for example, be a method such as alternate current etching, direct current etching or chemical etching, and the mechanical method may, for example, be sandblasting, filing or a method for transferring irregularities by rolling by rolls having a pattern formed thereon. For sandblasting, a wet blasting method employing a slurry having particles dispersed in a medium, or a dry blasting method of blowing particles by means of a compressed air or the like, may be used.

By using the surface-treated foil as the metal current collector foil, deterioration in performance during the use for a long period of time of the electric double layer capacitor can be reduced, and the long term reliability will increase. The reason for such an improvement is not clearly understood, but either one of the following two phenomena is considered to take place. (1) By the surface treatment, the surface of the metal current collector foil is roughened, whereby the area of contact with the formed product of sheet shape via the electroconductive bonding layer is increased, and the bonding strength is accordingly increased. (2) By the surface treatment, the state of surface functional groups of the metal current collector foil changes, whereby the metal current collector foil is chemically stabilized.

Further, as the metal current collector foil to be used in the present invention, the thickness is preferably from 10 to 100 $\mu$m, particularly preferably from 20 to 50 $\mu$m, and the tensile strength is preferably from 10 to 250 N/mm$^2$, particularly preferably from 50 to 100 N/mm$^2$. The breaking elongation is preferably from 1.5 to 25%, particularly preferably from 2 to 6%. If the thickness is too thin, the metal current collector foil tends to have a poor strength and tends to difficult to handle during the production process. On the other hand, if it is too thick, the proportion occupied by the metal current collector foil in the unit cell of the electric double layer capacitor increases, and the capacitance density of the capacitor tends to be low.

Further, if the tensile strength of the metal current collector foil is too low, or if the breaking elongation is too high, when it is laminated with the formed product of sheet shape, followed by rolling, the density of the formed product of heat shape tends to be hardly increased. On the other hand, if the tensile strength is too high or if the breaking elongation is too low, cracks are likely to form in the formed product of sheet shape during the above rolling. Here, the tensile strength and the breaking elongation are meant for values measured at room temperature in accordance with the methods prescribed in JIS Z2241. Further, in a case where the metal current collector foil is made of a metal having a relatively low melting point such as aluminum, even if heat treatment is carried out at a relatively low temperature (about 300° C.) for the purpose of e.g. drying the electroconductive bonding layer, annealing effects are likely to result, whereby physical property values such as the tensile strength and the breaking elongation are likely to change. Accordingly, in the present invention, these physical property values are physical property values of the metal current collector foil immediately before entering into step D.

Now, step C will be described. Step C is preferably a step comprising the following steps E to G:

Step E: a step of extrusion molding a mixture comprising the carbonaceous material, a PTFE as the first binder and a processing aid;

Step F: a step of forming the extrusion molded product obtained in step E into a sheet shape by reduction rolls; and Step G: a step of removing at least a part of the processing aid from the sheet-shaped product obtained in step F, to obtain the formed product of sheet shape.

In the present invention, the first binder is preferably PTFE, and when a formed product of sheet shape is prepared by the process comprising steps E to G, PTFE is used. By adjusting the extrusion direction and the rolling direction in steps E and F, it is possible to fibrillate PTFE longitudinally and transversely in a network form, whereby a formed product of sheet shape having high strength can be obtained. Especially when a screw extrusion molding method is employed as the extrusion molding method, PTFE will be fibrillated by the screw extrusion molding in a direction perpendicular to the extrusion direction, and by rolling, it will be fibrillated in a direction of passing through the reduction rolls. Accordingly, even when an elongated sheet is used, and the extrusion molding direction and the rolling directions are the same, fibrillation can be carried out longitudinally and transversely in a network form, such being desirable.

Here, PTFE includes not only a homopolymer of tetrafluoroethylene but also a copolymer obtained by copolymerizing tetrafluoroethylene with not more than 0.5 mol % of another monomer. If another monomer is not more than 0.5 mol %, no melt fluidity will be imparted to PTFE, and such a copolymer can be fibrillated in the same manner as the homopolymer of tetrafluoroethylene, to obtain a formed product of sheet shape having high strength and a low resistance. As such another monomer, hexafluoropropylene, chlorotrifluoroethylene, a perfluoro(alkyl vinyl ether), trifluoroethylene or a (perfluoroalkyl)ethylene may, for example, be mentioned.

If PTFE is of a low molecular weight, it tends to be a liquid or gel and can hardly be fibrillated. Accordingly, it preferably contains at least 50 mass % of a solid having a molecular weight of at least $1\times10^6$ as calculated from the standard specific gravity. Further, PTFE is preferably one obtained by emulsion polymerization, whereby it can easily be fibrillated.

The processing aid to be used in step E, is added so that PTFE is properly fibrillated and undergoes plastic deformation. It is not particularly limited so long as it is a liquid capable of wetting PTFE easily, and being removed easily from the formed electrode of sheet shape. Specifically, it may, for example, be ethyl alcohol, methyl alcohol, isopropyl alcohol, kerosine, solvent naphtha, white naphtha, ethylene glycol, propylene glycol, dipropylene glycol or glycerol. Further, an aqueous dispersion of PTFE may also be used as a processing aid, and it may be used alone or in combination with another processing aid.

In the mixture in step E, PTFE is preferably contained in an amount of from 1 to 20 mass %, more preferably from 5 to 10 mass %, to the carbonaceous material. If PTFE is less than 1 mass %, the strength of the electrode tends to be weak, and if it exceeds 20 mass%, the internal resistance of the electrode tends to increase.

Further, in the mixture in step E, the processing aid is preferably contained in an amount of from 20 to 200 mass %, particularly preferably from 40 to 100 mass %, to the carbonaceous material. If the processing aid is less than 20 mass %, the extrusion fluidity tends to be inadequate, whereby the molding tends to be difficult. If it exceeds 200 mass %, the extrusion pressure tends to be hardly increased, and PTFE tends to be hardly sufficiently fibrillated. Further, during extrusion, the processing aid is likely to ooze out. The addition of the processing aid may be after or at the same time as mixing the carbonaceous material and PTFE. During the mixing, the mixture comprising the carbonaceous material, PTFE and the processing aid may be granulated, but such granulation does not adversely affect the extrusion molding.

The mixture comprising the carbonaceous material, PTFE and the processing aid, is preliminarily preformed, then charged into an extruder and extrusion-molded into a molded product having a shape of e.g. a rod, a sheet or a tube. Then, in step F, the extrusion molded product is formed into a sheet shape by rolling. Here, the temperature of reduction rolls is preferably from 20 to 350° C., particularly preferably from 60 to 120° C. If the temperature of reduction rolls is lower than 20° C., PTFE will not be sufficiently fibrillated, and the resulting sheet tends to be brittle. If the temperature of reduction rolls exceeds 350° C., evaporation of the processing aid tends to be vigorous, whereby cracking, peeling or the like is likely to take place on the sheet surface. For the same reason, the temperature of reduction rolls during rolling in step D is preferably within the same range as mentioned above.

Then, in step G, drying is carried out to remove at least a part of the processing aid from the sheet-shaped product. The drying temperature is preferably a temperature which is at least the boiling point of the processing aid and at most the melting point of PTFE. Further, the formed product of sheet shape after the drying or after the semidrying by removing a part of the processing aid, may be subjected to stretching treatment or rolling again. When at least a part of the processing aid is removed, the spaces occupied by the processing aid will be void spaces, and accordingly, it is preferred to subsequently carry out rolling to reduce such void spaces, whereby the density of the formed product of sheet shape will increase.

In the case of stretching treatment, the stretching ratio is preferably from 1.1 to 5.0 times, and the stretching may be conducted in a mono-axial direction or multi-axial directions. Further, the stretching treatment can be carried out before the drying step. By the stretching treatment, fibrillation of PTFE will be accelerated, whereby a thin sheet having high strength and a low electrical resistance, can be obtained. The temperature for the stretching treatment is preferably from 30 to 350° C., particularly preferably from 200 to 320° C., whereby fibrillation of PTFE will be more accelerated. In the formed product of sheet shape thus obtained, PTFE is fibrillated and has a three dimensional network structure, whereby an increase of the resistance of the electrode layer by the addition of PTFE is small. Further, when carbon black is added as an electroconductive material, the carbon black will be pressed under a strong pressure in both steps of extrusion molding and rolling by rolls, whereby even with a small amount of carbon black, electrical connection can be established, whereby the electrode layer will have a low resistance.

The formed product of sheet shape, prepared as described above, is laminated with the metal current collector foil obtained via steps A and B, and then step D is carried out. Here, the formed product of sheet shape may be calcined, as the case requires, prior to lamination with the metal current collector foil. In such a case, calcination may be a complete calcination at a temperature of at least the melting point of PTFE or incomplete calcination at a temperature lower than the melting point of PTFE.

The formed product of sheet shape obtained in step C preferably has a thickness of from 100 to 400 μm, particularly preferably from 150 to 250 μm, and a density of from 0.4 to 0.7 g/cm$^3$, particularly preferably from 0.5 to 0.7 g/cm$^3$. If the thickness prior to rolling together with the metal current collector is too thin, the formed product of sheet shape is likely to break in step D, and if it is too thick, the thickness of the electrode layer will also be thick, whereby the resistance of the electrode layer will increase. Further, if the density is too low, the density of the electrode layer can not be sufficiently increased even when the operation of step D is carried out. On the other hand, in order to obtain a formed product of sheet shape by the operation of steps E to G, it is difficult to increase the density beyond 0.70 g/cm$^3$.

In the present invention, by carrying out step D by using the formed product of sheet shape obtained by steps E to G, the electrode layer can be made to be thin and have a high density. In order to increase the output density of the electric double layer capacitor, the resistance of the electrode is preferably low, and the thickness of the electrode layer is preferably thin. However, if the electrode layer is too thin, the volume ratio occupied by the electrode layer in the electric double layer capacitor cell, will be low, whereby the capacitance density of the electric double layer capacitor will be low, such being undesirable. Accordingly, the thickness of the electrode layer obtained after completion of step D is preferably from 80 to 300 μm, particularly preferably from 100 to 200 μm.

Further, the density of the electrode layer is preferably from 0.5 to 1.0 g/cm$^3$, particularly preferably from 0.6 to 0.85 g/cm$^3$. If the density of the electrode layer is low, the capacitance density of the electric double layer capacitor can not be sufficiently increased. On the other hand, if the density is too high, void spaces in the electrode layer will be little, whereby the electrolyte tends to hardly penetrate into the interior of the electrode layer, thus leading to a low capacitance density.

The electrode obtained by the process of the present invention can be used as both the positive electrode and the negative electrode of the electric double layer capacitor. The electric double layer capacitor of the present invention is prepared by using the above-described electrode assembly as a positive electrode assembly and a negative electrode assembly, forming an element by arranging the positive electrode assembly and the negative electrode to face each other via a separator, impregnating the element with an electrolyte, and accommodating it in a case. In order to obtain a high capacitance per unit cell, for example, pluralities of positive electrode assemblies and negative electrode assemblies may be alternately laminated and accommodated together with an electrolyte in a case, or long strip shaped positive electrode assembly and negative electrode assembly may be arranged to face each other via a separator and then wound to form an element, and the element may be accommodated together with an electrolyte in a cylindrical case.

The separator preferably has a thickness of from about 15 to 200 μm, particularly preferably from 50 to 100 μm, and a separator of porous sheet shape, for example, a sheet made of e.g. cellulose or glass fiber, is preferably employed. As the electrolyte, an aqueous electrolyte or a non-aqueous electrolyte may be used. However, the energy is proportional to the square of the voltage, and it is preferred to use a non-aqueous electrolyte having a high decomposition voltage. Specifically, it is preferably an electrolyte comprising a solvent such as propylene carbonate, ethylene carbonate, ethyl methyl carbonate, diethyl carbonate, dimethyl carbonate, acetonitrile or sulfolane, and an electrolyte such as a quaternary ammonium salt or a quaternary phosphonium salt.

Now, the present invention will be described in further detail with reference to Examples. However, it should be understood that the present invention is by no means restricted to such specific Examples.

EXAMPLE 1

To a mixture prepared by mixing a high purity activated carbon powder having a specific surface area of 1,800 m$^2$/g and a pore volume of 0.8 cm$^3$/g, Ketjenblack and PTFE powder in a mass ratio of 8:1:1, propylene glycol was added in an amount of 66 mass % to the activated carbon powder. This mixture was subjected to screw extrusion molding by means of a mono-axial extruder comprising a cylinder having an inner diameter of 40 mm, a full-flighted screw having a screw compression ratio of 1.6, and a nozzle designed so that the shape of the extruded product would be cylindrical (outer diameter: 102 mm, inner diameter: 86 mm), at a cylinder temperature of 80° C. and a nozzle temperature of 90° C.

The obtained cylindrical extruded product was cut in the longitudinal direction of the cylinder (extrusion direction), then opened and made flat. Then, it was rolled in the same direction as extrusion direction at a roll temperature of 80° C., followed by drying at a temperature of 250° C. for 60 minutes to remove propylene glycol, whereby a sheet having a thickness of 200 μm and a density of 0.5 g/cm$^3$, was obtained. From this sheet, a formed product of sheet shape of 4 cm×6 cm was cut out.

An electroconductive adhesive was coated on one side of an aluminum foil having a purity of 99.9% and a rectangular shape with a width of 4 cm, a height of 6 cm and a thickness of 30 μm and having a lead terminal. This electroconductive adhesive contained carbon black and a precursor of a polyamideimide resin in a mass ratio of 2:1, wherein the solvent was N-methyl-2-pyrrolidone, and the solid content concentration was 20 mass %.

Then, the aluminum foil coated with the electroconductive adhesive was dried at 260° C. for 30 minutes to form an electroconductive bonding layer. Here, the thickness of this electroconductive bonding layer was 5 μm, and the content of the solvent in the electroconductive bonding layer was 0.1 mass %. Further, the same aluminum foil as the aluminum foil used here, was subjected to heat treatment under the same conditions as above (at 260° C. for 30 minutes) without coating the electroconductive adhesive, and the mechanical properties after the heat treatment were measured by a tensile tester in accordance with the methods prescribed in JIS Z2241, whereby the tensile strength was 80 N/mm$^2$, and the breaking elongation was 2.5%.

Then, the above formed product of sheet shape was placed on this electroconductive bonding layer and laminated with the aluminum foil. The obtained laminate was rolled at a roll temperature of 150° C. and then punched out so that the portion where the electrode layer was formed would have an area of 4 cm×6 cm, and a lead portion would remain, to obtain an electrode assembly. The thickness of the electrode layer of this electrode assembly was 145 μm, and the density of the electrode layer was 0.7 g/cm$^2$. The thickness of the entire electrode assembly was 178 μm. Namely, the rolling reduction ratio of the formed product of sheet shape was 28%, the percent elongation was 18%, and the increase of the density was 40%.

Two sheets of such electrode assemblies were prepared and arranged so that the electrode layer sides of the two electrode assemblies faced each other. A separator made of cellulose fiber and having a thickness of 40 μm, was interposed between the electrode assemblies, which were then sandwiched between two glass plates having a thickness of 2 mm, a width of 5 cm and a height of 7 cm, to obtain an element. The total thickness of the two electrode assemblies and the separator was 0.4 mm.

As an electrolyte solution, a solution having 1.5 mol/l of triethylmonomethylammonium tetrafluoroborate dissolved in propylene carbonate, was used. The element was subjected to vacuum heating at 200° C. for 3 hours to remove impurities from the element, and then it was impregnated with the electrolyte solution under vacuum and then accommodated in a polypropylene rectangular bottomed cylindrical container, to obtain an electric double layer capacitor. The direct current resistance and the capacitance were measured at a current density of 20 mA/cm$^2$, and the capacitance per unit volume (capacitance density) and the resistance per unit volume were calculated. The results are shown in Table 1.

EXAMPLE 2

An electrode assembly having a thickness of 214 μm and an electrode layer having a thickness of 180 μm and a density of 0.65 g/cm$^3$, was obtained in the same manner as in Example 1 except that the rolling reduction ratio of the formed product of sheet shape was changed to 10%, the percent elongation was changed to 6%, and the increase of the density was changed to 30%. An electric double layer capacitor was prepared in the same manner as in Example 1 except that this electrode assembly was employed, and the same evaluation as in Example 1 was carried out. The results are shown in Table 1.

EXAMPLE 3 (Comparative Example)

An electrode assembly having a thickness of 233 μm and an electrode layer having a thickness of 198 μm and a density of 0.51 g/cm$^3$, was obtained in the same manner as in Example 1 except that the rolling reduction ratio of the formed product of sheet shape was changed to 1%, the percent elongation was changed to 0%, and the increase of the density was changed to 1%. An electric double layer capacitor was prepared in the same manner as in Example 1 except that this electrode assembly was employed, and the same evaluation as in Example 1 was carried out. The results are shown in Table 1.

EXAMPLE 4 (Comparative Example)

The formed product of sheet shape obtained in Example 1 was further rolled to obtain a formed product of sheet shape having a thickness of 145 μm and a density of 0.58 g/cm$^3$. The same electroconductive adhesive as used in Example 1 was coated on an aluminum foil having a thickness of 30 μm, and the above formed product of sheet shape was placed thereon and heated at 260° C. for 30 hours, to obtain an electrode assembly. The thickness of the electrode assembly was 180 μm. An electric double layer capacitor was prepared in the same manner as in Example 1 except that this electrode assembly was employed, and the same evaluation as in Example 1 was carried out. The results are shown in Table 1.

EXAMPLE 5

A sheet having a thickness of 250 μm and a density of 0.5 g/cm$^3$ was obtained by carrying out screw extrusion molding and rolling in the same manner as in Example 1 except that the rolling conditions were changed. From this sheet, a formed product of sheet shape of 4 cm×6 cm was cut out.

In the same manner as in Example 1, an electroconductive adhesive was coated on one side of an aluminum foil having a purity of 99.9% and having a rectangular shape with a width of 4 cm, a height of 6 cm and a thickness of 30 μm, and having a lead terminal.

Then, the aluminum foil coated with the electroconductive adhesive was dried at 200° C. for 40 hours to form an electroconductive bonding layer. The thickness of the electroconductive bonding layer was 5 μm, and the content of the solvent in the electroconductive bonding layer was 0.01 mass %. Further, the same aluminum foil as the aluminum foil used here, was subjected to heat treatment under the same conditions as above (at 200° C. for 40 hour) without coating the electroconductive adhesive, and the mechanical properties after the heat treatment were measured in the same manner as in Example 1, whereby the tensile strength was 60 N/mm$^2$, and the breaking elongation was 4.8%.

Then, the above formed product of sheet shape was placed on this electroconductive bonding layer, and an electrode assembly was obtained in the same manner as in Example 1. The thickness of the electrode layer of this electrode assembly was 138 μm, and the density of the electrode layer was 0.67 g/cm$^2$. The thickness of the entire electrode assembly was 166 μm. Namely, the rolling reduction ratio of the formed product of sheet shape was 45%, the percent elongation was 23%, and the increase of the density was 34%.

An electric double layer capacitor was prepared in the same manner as in Example 1 except that this electrode assembly was employed, and the same evaluation as in Example 1 was carried out. The results are shown in Table 1.

TABLE 1

| | Electrode density (%) | Internal resistance (Ω) | Capacitance (F) | Volume (cm$^3$) | Capacitance density (F/cm$^3$) |
|---|---|---|---|---|---|
| Ex. 1 | 0.7 | 0.275 | 14.4 | 0.96 | 15.0 |
| Ex. 2 | 0.65 | 0.325 | 15.3 | 1.12 | 13.7 |
| Ex. 3 | 0.51 | 0.417 | 14.4 | 1.21 | 11.9 |
| Ex. 4 | 0.58 | 0.270 | 11.9 | 0.96 | 12.3 |
| Ex. 5 | 0.67 | 0.250 | 14.1 | 0.89 | 15.8 |

According to the process of the present invention, an electrode assembly having a thin electrode layer with a high density and a low resistance formed on a current collector, can be obtained, and an electric double layer capacitor employing such an electrode assembly can be made to have a high capacitance density while maintaining a low internal resistance. Particularly when PTFE is used as the first binder, and a mixture comprising a carbonaceous material, PTFE and a processing aid, is extrusion molded, followed by rolling to obtain a formed product of sheet shape, the formed product of sheet shape has high strength, excellent breaking resistance and dimensional stability and a low resistance, since PTFE is fibrillated and has a three dimensional network structure.

Further, an operation to increase the density of the formed product of sheet shape and an operation to bond the metal current collector foil to the formed product of sheet shape, are carried out simultaneously in step D, whereby the productivity of the electric double layer capacitor can be increased.

The entire disclosure of Japanese Patent Application No. 2000-292680 filed on Sep. 26, 2000 including specification, claims and summary are incorporated herein by reference in its entirety.

What is claimed is:

1. A process for producing an electrode assembly for an electric double layer capacitor having an electrode layer comprising a carbonaceous material and a first binder, formed on at least one side of a metal current collector foil, which comprises the following steps A to D:
   - Step A: a step of coating an electroconductive adhesive comprising an electroconductive powder, a second binder and a solvent, on at least one side of a metal current collector foil;
   - Step B: a step of drying the metal current collector foil coated with the electroconductive adhesive to remove at least a part of the solvent and to form an electroconductive bonding layer;
   - Step C: a step of preparing a formed product of sheet shape comprising the carbonaceous material and the first binder; and
   - Step D: a step of placing the formed product of sheet shape on the electroconductive bonding layer to form a laminate comprising the metal current collector foil and the formed product of sheet shape, and rolling the laminate to reduce the thickness of the formed product of sheet shape by from 5 to 60% and to form an electrode layer comprising the formed product of sheet shape,
   - wherein in Step D, the laminate is rolled so that the percent elongation of the formed product of sheet shape and the metal current collector foil is from 1 to 40%.

2. The process for producing an electrode assembly according to claim 1, wherein in step B, the solvent is removed by drying until the content of the solvent based on the total mass of the electroconductive bonding layer becomes not more than 20 mass %.

3. The process for producing an electrode assembly according to claim 1, wherein in step D, the laminate is rolled so that the density of the formed product of sheet shape increases by from 2 to 50%.

4. The process for producing an electrode assembly according to claim 1, wherein step C comprises the following steps E to G:
   - Step E: a step of extrusion molding a mixture comprising the carbonaceous material, a polytetrafluoroethylene as the first binder and a processing aid;
   - Step F: a step of forming the extrusion molded product obtained in step E into a sheet shape by reduction rolls; and
   - Step G: a step of removing at least a part of the processing aid from the sheet-shaped product obtained in step F, to obtain the formed product of sheet shape.

5. The process for producing an electrode assembly according to claim 4, wherein in step G, after removing at least a part of the processing aid, rolling by reduction rolls is carried out to obtain the formed product of sheet shape.

6. The process for producing an electrode assembly according to claim 4, wherein the carbonaceous material has a pore volume of from 0.7 to 1.2 cm$^3$/g and a specific surface area of from 900 to 2300 m$^2$/g, and in the mixture, the first binder is contained in an amount of from 1 to 20 mass % to the carbonaceous material and the processing aid is contained in an amount of from 20 to 200 mass % to the carbonaceous material.

7. The process for producing an electrode assembly according to claim 4, wherein in step D, the laminate is rolled by reduction rolls maintained at a temperature of from 20 to 350° C.

8. The process for producing an electrode assembly according to claim 4, wherein in step B, the solvent is removed by drying until the content of the solvent based on the total mass of the electroconductive bonding layer becomes not more than 20 mass %.

9. The process for producing an electrode assembly according to claim 4, wherein in step D, the laminate is rolled so that the density the formed product of sheet shape increases by from 2 to 50%.

10. The process for producing an electrode assembly according to claim 1, wherein the metal current collector foil is made of aluminum or an aluminum alloy.

11. The process for producing an electrode assembly according to claim 1, wherein the metal current collector foil is surface-treated by a chemical method and/or a mechanical method, and then, the electroconductive adhesive is coated on the surface-treated side.

12. The process for producing an electrode assembly according to claim 1, wherein in step B, the solvent is removed by drying until the content of the solvent based on the total mass of the electroconductive bonding layer becomes not more than 5 mass %.

13. The process for producing an electrode assembly according to claim 1, wherein in step D, the laminate is rolled so that the thickness of the formed product of sheet shape decreases by from 5 to 50%.

14. The process for producing an electrode assembly according to claim 13, wherein said thickness decreases by from 20 to 50%.

15. The process for producing an electrode assembly according to claim 1, wherein the metal current collector foil has a thickness of from 10 to 100 $\mu$m, a tensile strength of from 10 to 250 N/mm$^2$ and a breaking elongation of from 1.5 to 25%.

16. A process for producing an electric double layer capacitor, which comprises using an electrode assembly having an electrode layer comprising a carbonaceous material and a first binder, formed on at least one side of a metal current collector foil, as a positive electrode assembly and a negative electrode assembly, forming an element by arranging the positive electrode assembly and the negative electrode assembly to face each other via a separator, and impregnating the element with an electrolyte, wherein the electrode assembly is prepared by the following steps A to D:
   - Step A: a step of coating an electroconductive adhesive comprising an electroconductive powder, a second binder and a solvent, on at least one side of a metal current collector foil;
   - Step B: a step of drying the metal current collector foil coated with the electroconductive adhesive to remove at least a part of the solvent and to form an electroconductive bonding layer;
   - Step C: a step of preparing a formed product of sheet shape comprising the carbonaceous material and the first binder; and
   - Step D: a step of placing the formed product of sheet shape on the electroconductive bonding layer to form a laminate comprising the metal current collector foil and the formed product of sheet shape, and rolling the laminate to reduce the thickness of the formed product of sheet shape by from 5 to 60% and to form an electrode layer comprising the formed product of sheet shape,
   - wherein in Step D, the laminate is rolled so that the percent elongation of the formed product of sheet shape and the metal current collector foil is from 1 to 40%.

17. The process for producing an electric double layer capacitor according to claim 16, wherein in step B, the solvent is removed by drying until the content of the solvent based on the total mass of the electroconductive bonding layer becomes not more than 20 mass %.

18. The process for producing an electric double layer capacitor according to claim 16, wherein by step D, the density of the electrode layer increases by from 2 to 50%.

19. The process for producing an electric double layer capacitor according to claim 16, wherein step C comprises the following steps E to G:

Step E: a step of extrusion molding a mixture comprising the carbonaceous material, a polytetrafluoroethylene as the first binder and a processing aid;

Step F: a step of forming the extrusion molded product obtained in step E into a sheet shape by reduction rolls; and Step G: a step of removing at least a part of the processing aid from the sheet-shaped product obtained in step F, to obtain the formed product of sheet shape.

20. The process for producing an electric double layer capacitor according to claim 19, wherein in step G, after removing at least a part of the processing aid, rolling by reduction rolls is carried out to obtain the formed product of sheet shape.

21. The process for producing an electric double layer capacitor according to claim 19, wherein in step D, the laminate is rolled by reduction rolls maintained at a temperature of from 20 to 350° C.

22. The process for producing an electric double layer capacitor according to claim 19, wherein by step D, the density of the electrode layer increases by from 2 to 50%.

23. The process for producing an electric double layer capacitor according to claim 16, wherein the metal current collector foil is made of aluminum or an aluminum alloy.

24. The process for producing an electric double layer capacitor according to claim 16, wherein the laminate is rolled so that the thickness of the formed product of sheet shape decreases by from 5 to 50%.

25. The process for producing an electric double layer capacitor according to claim 24, wherein said thickness decreases by from 20 to 50%.

26. The process for producing an electric double layer capacitor according to claim 16, wherein the metal current collector foil has a thickness of from 10 to 100 $\mu$m, a tensile strength of from 10 to 250 N/mm$^2$ and a breaking elongation of from 1.5 to 25%.

* * * * *

UNITED STATES PATENT AND TRADEMARK OFFICE
CERTIFICATE OF CORRECTION

PATENT NO. : 6,638,385 B2
DATED : October 28, 2003
INVENTOR(S) : Ishikawa et al.

It is certified that error appears in the above-identified patent and that said Letters Patent is hereby corrected as shown below:

Title page, Item [54] and Column 1, lines 1-3,
Title, should read:
-- PROCESS FOR PRODUCING AN ELECTRODE ASSEMBLY FOR AN ELECTRIC DOUBLE LAYER CAPACITOR --

Signed and Sealed this

Seventeenth Day of February, 2004

JON W. DUDAS
*Acting Director of the United States Patent and Trademark Office*